March 18, 1941.  J. PEARLMAN  2,235,727
MERCHANDISE HANDLING APPARATUS
Filed Sept. 14, 1939   2 Sheets-Sheet 1
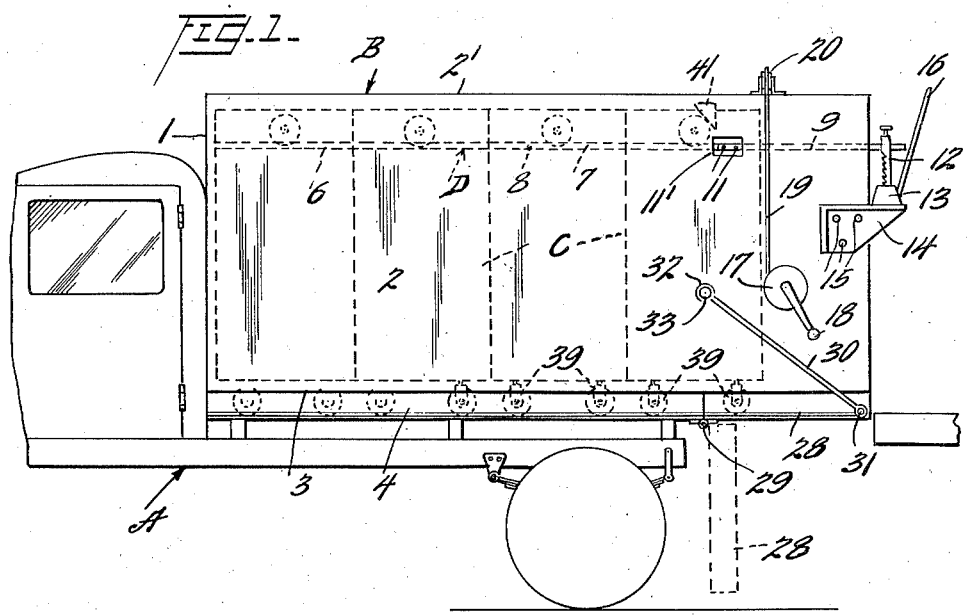
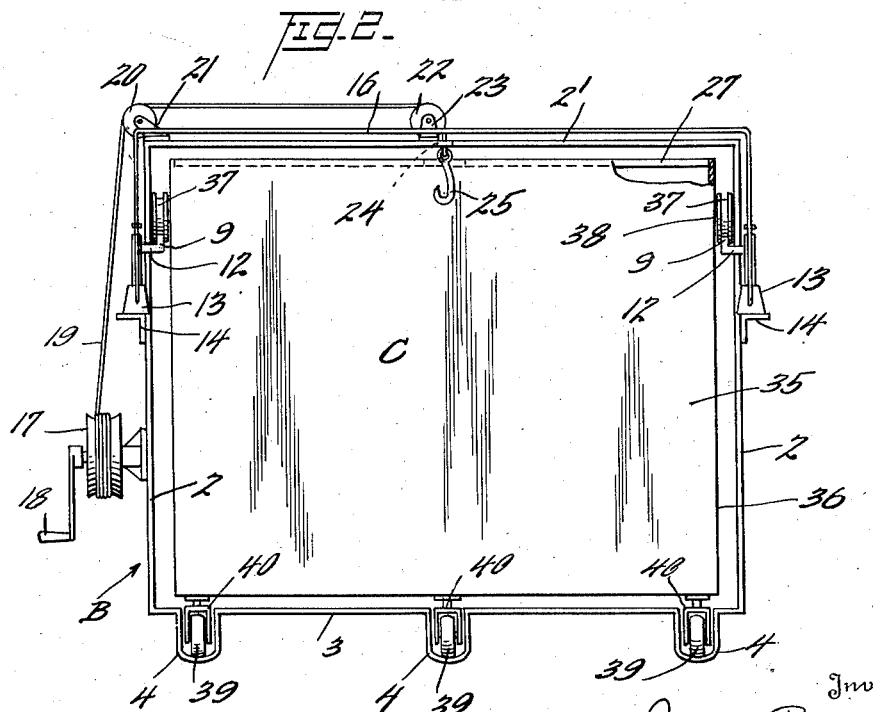
Inventor
Jack Pearlman
By
Shreve, Crowe & Gordon
Attorney March 18, 1941. J. PEARLMAN 2,235,727
MERCHANDISE HANDLING APPARATUS
Filed Sept. 14, 1939 2 Sheets-Sheet 2
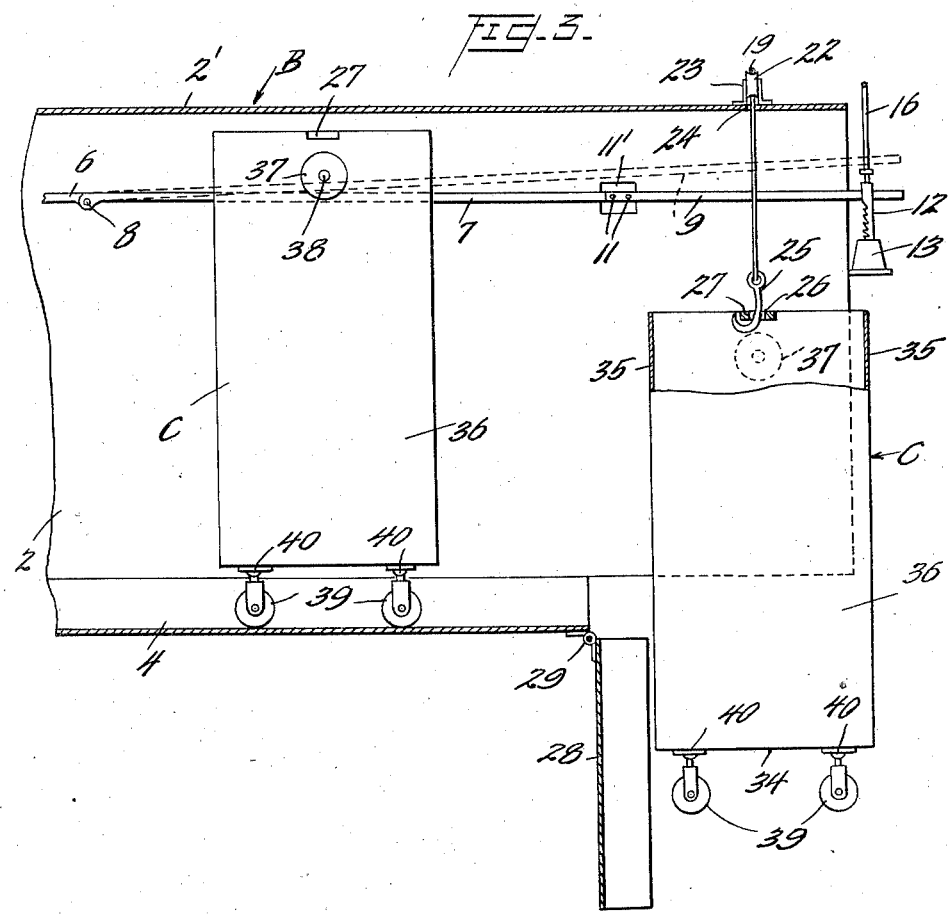
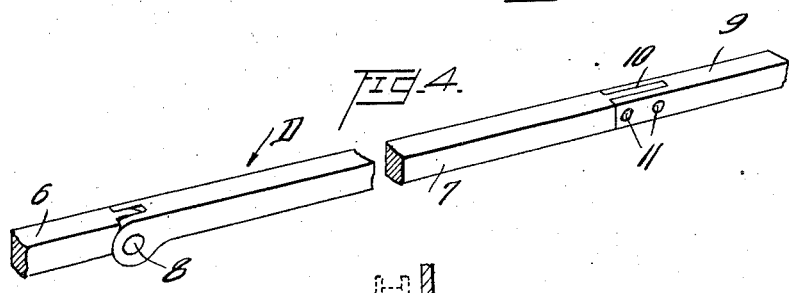
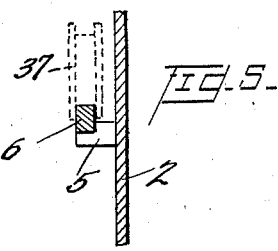
Inventor
Jack Pearlman
By Shreve, Crowe + Gordon
Attorneys Patented Mar. 18, 1941

2,235,727

UNITED STATES PATENT OFFICE 2,235,727

MERCHANDISE HANDLING APPARATUS

Jack Pearlman, East Hempstead, Long Island, N. Y.

Application September 14, 1939, Serial No. 294,943

5 Claims. (Cl. 214—75)

Generically this invention relates to merchandise handling apparatus but it is more especially directed to equipment for truck bodies including a plurality of merchandise carrying units and means for expeditiously loading and unloading said units.

One of the principal objects of this invention is the provision of apparatus for loading, transporting and unloading merchandise in predetermined amounts to various destinations.

An important object of this invention is the provision of a truck body having a lower guide track and a primary supporting upper track and means in connection with said tracks for causing a series of merchandise carriers to automatically traverse said tracks in vehicle loading direction.

Another important object of this invention is the provision of a truck body having upper supporting rails with hinged sections upon which is adapted to be suspended a plurality of merchandise carrying units, means for adjusting the hinged portions of said rails to cause said units to automatically traverse said rails in loading direction and to normally maintain said units in loaded position.

Another important object of this invention is the provision of a truck or motor vehicle equipment including lower guide rail means and upper merchandise container supporting rails, said apparatus including means for loading the individual units from the ground and bringing them into supporting engagement with said upper rails and means operatively associated with said rails for causing said units to automatically move to loading position.

A still further object of this invention is the provision of wheel supported individual merchandise carrying units adapted to be moved to a truck loading point, a particularly constructed truck body including supporting track members adapted to transport a number of said units for delivery to various points, means for receiving the respective carriers from a loading platform and causing them to automatically assume loading position when positioned on said track and additional means carried by said body adapted to hoist the respective carriers from the ground to said supporting tracks and to lower them, as desired.

With these and other objects in view, which will become apparent as the description proceeds, the invention resides in the construction, combination and arrangement of parts, hereinafter more fully described and claimed, and illustrated in the accompanying drawings, in which like characters of reference indicate like parts throughout the several figures, of which:

Fig. 1 is a side elevation of a truck body embodying my improvements.

Fig. 2 is a rear elevation of the same.

Fig. 3 is a longitudinal section through the body showing a container being hoisted into the same.

Fig. 4 is a detail perspective of one of the rails.

Fig. 5 is a detail section on the line 5—5 of Fig. 3.

In view of the ever increasing traffic congestion, it is important that merchandise delivering trucks in order to facilitate delivery and cause as little congestion as possible, be able to effect delivery at a given point within the least possible time interval. In order to accomplish this result and at the same time expedite the initial loading and unloading at distributive and pick-up points I have provided a truck body having channel tracks formed in the bottom and track rails adjacent the top of the body having rearwardly extending sections hinged substantially centrally of the body and individual merchandise containers or truck body sections supported on rollers designed to be received by said channel bottom tracks, said containers having a wheel centrally mounted on opposite sides adjacent their top edges for engagement with said upper rails and a lift bar suitably and rigidly connected to said top edges and overlying said wheels, and inter-connected jack means mounted on opposite sides of the truck body adjacent its rear end adapted to support the rear ends of said hinged track members, so that when a container is positioned in said truck body operation of said jacks elevates the ends of the tracks and causes the respective containers to traverse said track under their own momentum toward the front, thereby effecting their automatic loading, and means in connection with said truck body, where there is no loading platform, to engage said lift bar and hoist the respective containers for position on said track as above noted, that I designed the apparatus forming the subject matter of this invention.

In the illustrated embodiment characterizing this invention there is shown a truck or motor vehicle A carrying a truck body B and a plurality of individual merchandise carriers or wheeled containers C.

My improved truck body B is suitably supported and carried by the conventional truck A and is formed with sides 2, top 2' and bottom 3. Said bottom 3 is formed in the present instance with a trio of channel track rails 4 extending below the plane of said bottom as and for a purpose directly more fully appearing. Suitably attached to the opposite inner surface of the respective sides 2 by bolts or in any suitable manner are the track supporting anchor members 5 adapted to support the respective track rails D comprising the sections 6 rigidly connected in any suitable manner to their anchor members 5, movable sections 7 hingedly connected to sections 6 substantially centrally of the length of said tracks as at 8, and demountable sections 9 having, in the present instance, dovetail connection with sections 7 as at 10 and rigidly connected by the detachable pins 11. The free ends of said sections 9 are adapted to extend rearwardly beyond the end of body B and supported on arms 12 of the jacks 13 positioned on and suitably attached to the respective angle iron platforms 14 secured to the outer surface of sides 2 by rivets or bolts 15, said jacks being inter-connected and operated by the substantially U-shaped handle 16, the operation of which effects the simultaneous raising and lowering of tracks D at their free ends. An opening 11' is formed in side 2 to facilitate the disconnection of rail sections 9, as and for a purpose directly appearing.

Suitably mounted on one of the sides 2 of body B spaced substantially equi-distant from its rear end and bottom 3 is a windlass 17 having handle 18 adapted to wind and unwind cable 19 suitably connected to said windlass, said cable adapted to travel over pulley 20 located above windlass 17 on bracket 21 mounted on and suitably attached to top 2' adjacent side 2, and pulley 22 journaled in bracket 23 similarly mounted on and attached to top 2', said cable passing through opening 24 in top 2' and with its end suitably fastened to hook 25 adapted for detachable engagement in opening 26 of lift bar 27 attached in any desired manner to the upper end of container C to effect, by operation of windlass 17, the hoisting of a container C as shown in Fig. 3. In order to permit the hoisting of said container C for suspension from track rails D the bottom of said body is formed with a bottom rail section 28 hinged as at 29 and shown in lowered position in Fig. 3, said section being normally maintained in raised position by chains or rods 30 having one end pivotally connected thereto as at 31 and detachably connected by hooks or other fastening means 32 formed on their free ends and adapted for detachable engagement with anchor pins or other suitable means 33 suitably attached to the respective sides 2.

The merchandise containers or auxiliary truck sections C each being preferably of rectangular configuration and formed with bottom 34, sides 35, and ends 36. Said lift bar 27 has its ends, in the present instance, embedded centrally in the top edges of ends 36 and suitably secured therein. Each container C has a suspension pulley or grooved wheel 37 journaled on stud shaft 38 suitably mounted in each of its ends 36 spaced slightly below and in alignment with bar 27, said wheels adapted to travel on rails D from which said container is suspended, as will hereinafter more fully appear.

Said container or carrier C is supported on two series of casters 39 suitably secured to its bottom as at 40, each series comprising a trio corresponding to tracks 4 in which they are adapted to engage when said container is positioned or rolled into said truck body B as shown in Fig. 2.

While I have referred to two series of casters, each comprising a trio so that two will engage in each of the three tracks, it is apparent that in place of the two center casters one caster may be centrally positioned under said container to engage in the center track 4 if desired.

It will be noted that while a container C may by virtue of the swivel casters be rolled in any direction, they are constructed narrower one way than the other and are designed to be loaded into the truck transverse of the body which will enable a greater number to be carried at one time.

Attached as desired to the inner surface of sides 2 above and adjacent the dove-tail ends of rail sections 7 are the chock elements 41 designed, if desired, to prevent rearward movement of said containers C, and especially tending to maintain the containers in their loaded positions during rough vehicular travel, etc.

While the operation of the instant apparatus would seem to be clear from the above description, it might be well to further state that initially the truck is backed up to a loading platform located even with the body of the truck and each container after being filled with merchandise is rolled to the truck and positioned transversely thereof so that the rollers will engage in tracks 4 as it is rolled into the truck, the free ends of rails D having been first positioned so as to engage under wheels 37 as casters 39 engage in tracks 4, and when the container has passed beyond jacks 13 the latter are actuated by handle 16 to elevate the rear portions of said rails D whereby the container will move over said rails under its own momentum until it reaches the front end 1 of truck. This procedure is repeated until the truck has become loaded. When the final container has been positioned the jacks will hold the end of the tracks elevated to maintain the containers on said track and tend to hold them in proper loaded position.

The loading procedure is reversed with respect to the containers when each is deposited at its particular delivery point.

When loading the container or containers where there is no loading platform, I have provided means so that the loaded or empty containers may be handled by a single operator handily and speedily. Where a container is on the ground or positioned below the bottom of the truck, it is only necessary to disconnect the bottom tail section supporting members 30 from their anchor connections 33, which permits bottom section 28 to drop as shown in Fig. 3, remove pins 11 permitting disconnection of rail sections 9, then engage hook 25 in opening 26 in bar 27 and operate handle 18 of windlass 17 to hoist said container into the truck body, return rail sections 9 and bottom section 28 to their initial positions, disconnect hook 25 and operate jacks 13 as above described to effect proper loading of the container in the truck. It is obvious that where it is desired to deposit a container from the truck on the ground or street it is only necessary to reverse the above operation.

From the above it is apparent that I have designed a merchandise handling apparatus permitting rapid handling of merchandise to a number of delivery points during a single trip by means of individual auxiliary wheeled containers designed for cooperation with a novel vehicle body construction including loading and unloading co-operating means whereby a single operator may effect rapid loading and unloading of respective containers, either to a single delivery point or to a number of delivery points during a given trip, said apparatus being simple in construction, manufacturable at a reasonable cost, efficient for the purposes intended, and effecting a reduction in delivery costs.

Although in practice I have found that the form of my invention illustrated in the accompanying drawings and referred to in the above description as the preferred embodiment, is the most efficient and practical; yet realizing the conditions concurrent with the adoption of my invention will necessarily vary, I desire to emphasize that various minor changes in details of construction, proportion and arrangement of parts, may be resorted to within the scope of the appended claims without departing from or sacrificing any of the principles of this invention.

Having thus described my invention, what I desire protected by Letters Patent is as set forth in the following claims:

1. In a wheeled vehicle including a body having bottom and side portions, upper track members carried by the respective side portions, and lower track means carried by said bottom, said upper track members having demountable end sections, said bottom underlying said sections having a normally closed hinged section, and elevating means carried by said body, of a plurality of mobile containers adapted to be loaded into and out of said body, each container including supporting wheels engageable with said lower track, and upper suspension wheels engageable with said upper track members, and means carried by its upper end adapted for detachable engagement with said elevating means, whereby operation of said elevating means is adapted to successively elevate the respective containers to loading position in said body and inversely to unloading position, when said track sections are demounted and said bottom section is in open position.

2. In equipment for delivery means provided with sides and bottom, the combination of a track carried by the bottom, track rails carried by the respective sides, said rails having movable sections, jack means carried by the body in supporting relation with respect to said movable sections adapted to effect raising and lowering of said sections, of a plurality of mobile carriers, the wheels for the respective carriers adapted to engage said bottom track, additional supporting wheels mounted adjacent the top of said carriers adapted to travel on said upper rails, operation of said raising and lowering means in raising direction causing said carriers to assume loading position and to normally prevent disengagement of the carriers from the track in unloading direction.

3. A merchandise delivery apparatus including a body having upper and lower tracks, a plurality of merchandise carriers of a height substantially corresponding to said body, each carrier having a plurality of supporting wheels adapted to engage said lower track and a pair of oppositely positioned suspension wheels adapted to travel on said upper tracks, said body having a hinged drop section, said upper tracks having demountable sections, means carried by said body and co-acting with the respective carriers for lifting them from the ground and positioning them in loading position with respect to said tracks, and additional means in connection with said upper tracks for causing the respective containers to automatically assume loading position on said tracks, and means for normally preventing disengagement of the containers from said track.

4. In a wheeled vehicle including a body having bottom and side portions, upper track members carried by the respective side portions, said track members having demountable end sections, said bottom underlying said sections having a normally closed hinged section, and elevating means carried by said body, lower guide means extending in parallelism with said upper tracks, of a plurality of mobile containers adapted to be loaded into and out of said body, each container adapted to engage said lower guide means and having upper suspension wheels engageable with said upper track members and means carried by said container adapted for detachable engagement with said elevating means, whereby operation of said elevating means is adapted to successively elevate the respective containers to loading position in said body and inversely to unloading position, when said truck sections are demounted and said bottom section is in open position.

5. A merchandise delivery apparatus including a body having upper tracks, a plurality of merchandise carriers, guide means carried by said body extending in parallelism with said upper tracks and adapted to guide the lower end of said carriers, each carrier having a pair of oppositely positioned suspension wheels adapted to travel on said upper tracks, said body having a hinged drop section, said upper tracks having demountable sections, means carried by said body and co-acting with the respective carriers for lifting them from the ground and positioning them in loading position with respect to said tracks, and additional means in connection with said upper tracks for causing the respective containers to automatically assume loading position on said tracks, and means for normally preventing disengagement of the containers from said track.

JACK PEARLMAN.